March 5, 1968   L. F. KOCHER   3,372,275
NEUTRON FILM DOSIMETER USING MULTIPLE FILTERS
Filed May 27, 1966   2 Sheets-Sheet 1

Inventor
Leo F. Kocher
Attorney

United States Patent Office 3,372,275
Patented Mar. 5, 1968

3,372,275
NEUTRON FILM DOSIMETER USING MULTIPLE FILTERS
Leo F. Kocher, Richland, Wash., assignor to the United States of America as represented by the United States Atomic Energy Commission
Filed May 27, 1966, Ser. No. 554,292
7 Claims. (Cl. 250—83.1)

This invention was made in the course of or under a contract with the United States Atomic Energy Commission.

This invention relates to a film dosimeter adapted to be worn on the body which will measure the fast neutron dose and the slow neutron dose received by the wearer and will do so in the presence of alpha, beta and photon radiation.

My dosimeter utilizes a sheet of photographic film which is mounted on a badge or the like, so that it can be worn next to the body. Adjacent the film, on the side away from the body, are three filters, which will be designated A, B and C throughout this specification.

Filter A is composed of material which has a low capture cross section for both thermal neutrons and fast neutrons.

Filter B comprises an inner layer, adjacent the film, which has a high capture cross section for thermal and epithermal neutrons. Rhodium is my preferred material. It also comprises an outer layer, preferably cadmium, which has high capture cross section for thermal neutrons, and which is sufficiently thick to absorb all thermal neutrons reaching it under the expected flux levels.

Filter C comprises an inner layer which is the same as that for Filter B. The outer layer, however, comprises a material having a low capture cross section for fast and thermal neutrons.

All three filters are opaque to alpha and beta radiation and are, moreover covered on all sides by plastic which is opaque to alpha radiation. They are so designed that all have an equal absorption of photon (gamma and X) radiation.

The operation of the dosimeter is as follows. Fast neutrons penetrate all three filters without absorption. However, the body of the wearer is a moderator for fast neutrons. A portion of the neutrons, after being slowed to thermal and epithermal velocities is dispersed back to the filters.

The rhodium of filter C captures both the incident thermal neutrons and the moderated neutrons dispersed by the wearer's body. It emits beta and gamma radiation, which affect the photographic film to a degree which is a function of the incident thermal neutron dose received and also of the incident fast neutron dose received.

The rhodium of filter B is shielded from the incident thermal neutrons by the cadmium layer. Therefore, the effect of its beta and gamma decay radiation is a function solely of the incident fast neutron dose. The rhodium is essentially opaque to the relatively soft gamma produced by neutron capture in the cadmium.

Filter A does not respond significantly to neutrons.

The incident photon radiation remains to be considered. As stated above, all three filters have the same absorption for photon radiation, hence, the film adjacent filters A, B, and C will be equally affected.

After development of the film, the effects on it will be a function of density. The relationships may be expressed by the following equations:

$$D_A = D_{\gamma A} + D_{fnA} + D_{tnA} \quad (1)$$

$$D_B = D_{\gamma B} + D_{fnB} + D_{tnB} \quad (2)$$

$$D_C = D_{\gamma C} + D_{fnC} + D_{tnC} \quad (3)$$

wherein $D_{\gamma A}$ = density behind filter A due to incident photon radiation.
$D_{fnA}$ = density behind filter A due to incident fast neutron radiation.
$D_{tnA}$ = density behind filter A due to incident slow (thermal and epithermal) neutron radiation.
$D_A$ = total density behind filter A.

The subscripts B and C indicate the corresponding values for filters B and C.

Since the three filters have the same absorption for photon radiation $$D_{\gamma A} = D_{\gamma B} = D_{\gamma C} \quad (4)$$

filters B and C provide equal film density when mounted on the body and exposed to fast incident neutron radiation.

Therefore:

$$D_{fnB} = D_{fnC} \quad (5)$$

From the above equations:

$$(D_{tnC} - D_{tnB}) = D_C - D_B \quad (6)$$

$$(D_{fnB} - D_{fnA}) = D_B - D_A - (D_{tnB} - D_{tnA}) \quad (7)$$

It is not necessary to determine the individual quantities within the parentheses.

For a given filter system, calibration curves can be determined experimentally which will give the thermal and fast neutron does as function of $D_C - D_B$ and $D_B - D_A$, respectively.

This will be illustrated in connection with the specific example which will now be described.

In the drawing, FIGURE 1 shows diagrammatically a front view of one embodiment of my invention.

Figure 1:
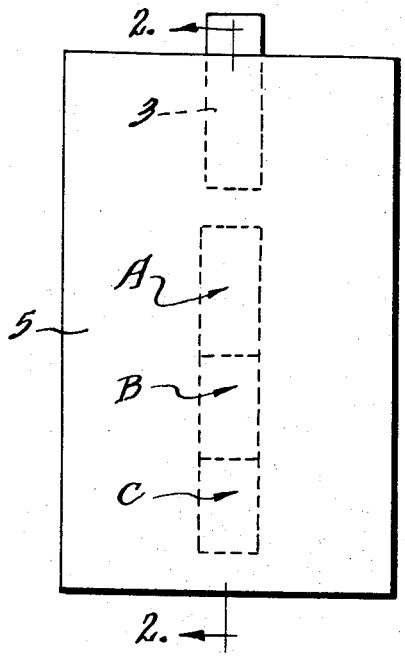
Figure 2:
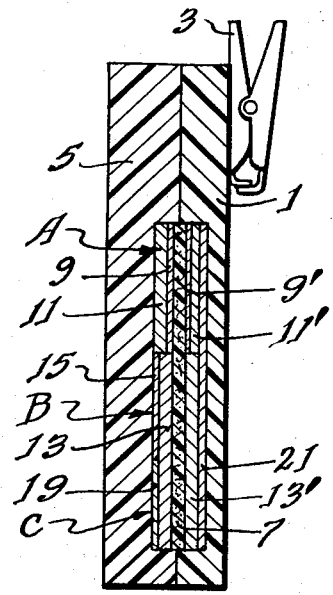
FIGURE 2 is a section on the line 2—2 of FIGURE 1.

A badge type dosimeter is shown diagrammatically in FIGURES 1 and 2. The mechanical details, which form no part of this invention, are essential the same as those shown in my U.S. Patent 3,202,821, granted Aug. 24, 1965.

As shown in FIGURES 1 and 2, my dosimeter comprises a back 1 on which is mounted a clip or the like 3 for securing the dosimeter to the clothing of the wearer. The dosimeter also includes a cover 5 mounted in which are filters A, B and C. A sheet 7 of a commercially available dosimeter film carrying, e.g., Du Pont 508 emulsion, is mounted between back 1 and cover 5. Back 1 and cover 5 are made of a plastic, preferably an acrylonitrile-butadiene-styrene copolymer, such as that sold under the name Cycolac.

Filter A comprises a sheet 9 of stainless steel shim stock 0.003 in. thick and a sheet 11 of tin 0.040 in. thick.

Filter B comprises sheet 13 of rhodium 0.010 in. thick and a sheet 15 of cadmium 0.030 in. thick.

Filter C comprises sheet 13 of rhodium and a sheet 19 of tin 0.030 in. thick. The use of a single sheet of rhodium for Filters B and C simplifies manufacture and also prevents leakage.

While the filter combination just described will give satisfactory results, I have found that improved sensitivity and accuracy are obtained if filters are also provided behind the film. Thus, I have shown in FIGURE 2, mounted in back 1, a sheet 21 of lead 0.010 in. thick, which is in back of filters A, B and C. In back of filter A is a sheet 9′ of stainless steel 0.003 in. thick and a sheet 11′ of tin 0.010 in. thick. In back of filters B and C is a sheet 13′ of rhodium 0.010 in. thick. This arrangement reduces and equalizes the effect of gamma radiation from the body which results from neutron activation reactions. The provision of rhodium on both sides of the film also increases the sensitivity of the dosimeter.

The person whose neutron dose is to be measured wears the dosimeter on the side of his body from which he may expect to receive neutron radiation (normally the front) with back 1 toward his body. After a suitable length of time, based on the known or estimated conditions, film 7 is removed and developed. The density of the film behind filters A, B and C is then measured by means of a densitometer which gives values proportional to the density of the film. The values $D_C - D_B$ and $D_B - D_A$ (defined above) are then compared with calibration curves obtained experimentally for a given combination of film and filters and a standardized developing procedure.

Examples of such curves for the combination described above are shown in FIGURES 3 and 4, FIGURE 3 being a calibration curve for fast neutrons and FIGURE 4 a curve for thermal neutrons.

Figure 5:
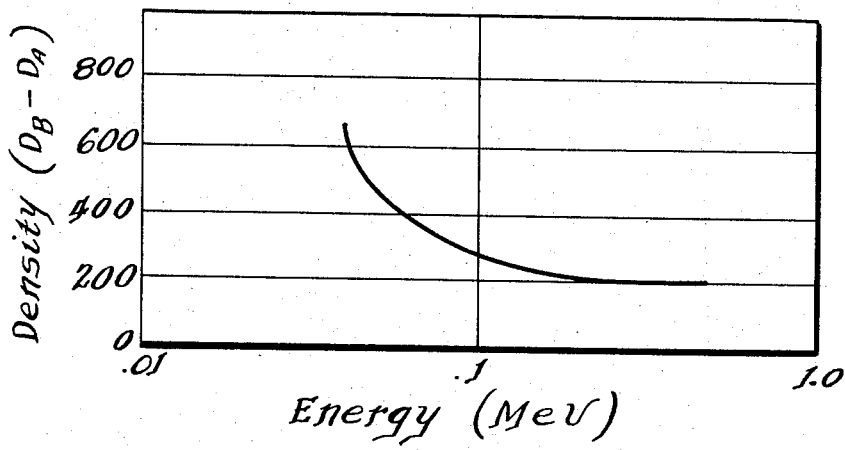
FIGURE 5 is a graph showing the relative response to fast neutrons of different energies.

The response of the dosimeter to fast neutrons is energy-dependent, though much less so than previously known fast neutron film dosimeters. FIGURE 5 shows the relative response to fast neutrons of different energies. If the neutron energy spectrum in a given location is known, the curve may be used to apply a correction factor or to indicate the possible range in dose actually received.

Figure 3:
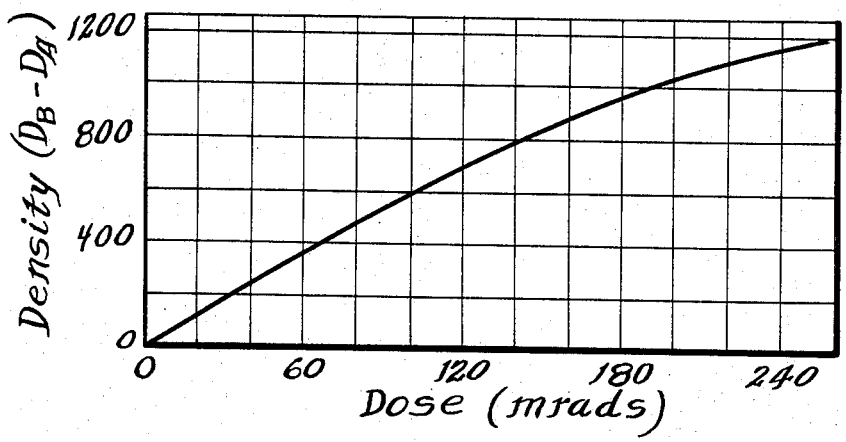
FIGURE 3 is a graph of a characteristic curve for fast neutrons.
Figure 4:
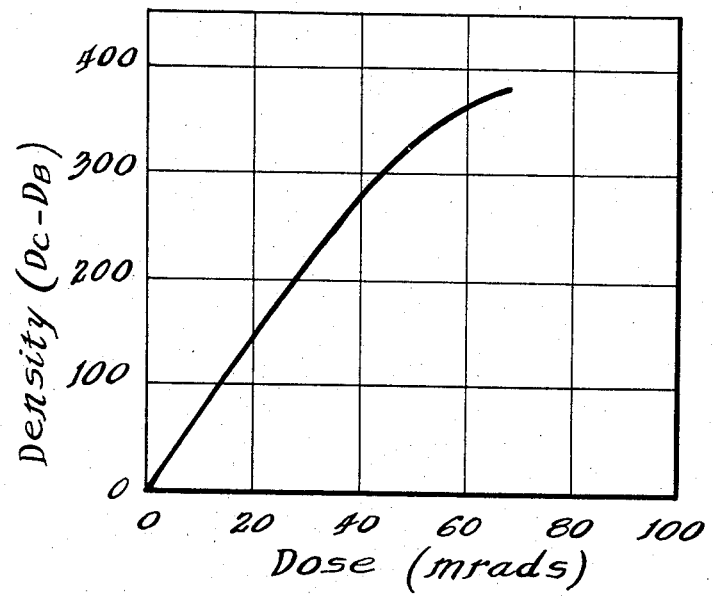
FIGURE 4 is a graph of a characteristic curve for thermal neutrons.

It will be noted that the doses shown on FIGURES 3 and 4 are in the millirad range. This is suitable for routine dosimetry, but not for measurement of doses received in criticality incidents. However, the identical device can be made suitable for this latter purpose, merely by substituting a much less sensitive film, e.g., the commercially available low sensitivity dosimeter film having Du Pont 1290 emulsion. The two types of film can be superposed in the dosimeter. The commercially available Du Pont 558 packet is a suitable combination of the 508 and 1290 films.

The curve of FIGURE 3 was obtained by exposing the dosimeter to a source consisting of $PuF_4$, FIGURE 4 by exposure to neutrons from that source thermalized by paraffin wax.

In obtaining FIGURE 5, neutrons of various energies were obtained by impinging the beam of a positive ion accelerator on various targets and by the use of $PuF_4$ and PuBe sources. The dosimeter was subjected to a dose of 100 millirads at each energy, with the badge mounted on a block of polyethylene nine inches thick.

Various changes may be made in the dosimeter without departing from my invention. For example, other metals having the proper response to fast and thermal neutrons, e.g., samarium and gadolinium, may be substituted for the rhodium. Other metals having low capture cross sections for fast and thermal neutrons, e.g., aluminum, may be substituted for the tin in Filter C. Filter A must then be made of a metal, or a combination of metals, which will give the same absorption of photon radiation as the other two filters. Since the absorption of photon radiation is energy-dependent, a combination of metals will ordinarily be required in Filter A as well as in the other two filters.

While the dosimeter as shown is primarily intended for personal dosimetry, it may be used for area dosimetry simply by mounting the device on a moderator. A block of paraffin or polyethylene at least four inches thick is sufficient. Other moderators, such as wood or, less conveniently, water could be employed.

The embodiments of the invention in which exclusive property or privilege is claimed are defined as follows:

1. A film dosimeter adapted to be worn on the body, comprising at least one sheet of photographic film, three filters mounted adjacent to one face of said film, said filters having the following characteristics:

Filter A, comprising material which has a low capture cross-section for thermal neutrons and fast neutrons;

Filter B, comprising an inner layer adjacent the film having a high capture cross-section for thermal neutrons and an outer layer of a different material also having a high capture cross-section for thermal neutrons, both layers having low capture cross-sections for fast neutrons;

Filter C, comprising an inner layer of material adjacent the film which has a high capture cross-section for thermal neutron and an outer layer which has low capture cross-section for thermal neutrons, both layers having low capture cross-sections for fast neutrons;

Filters A, B and C being so designed as to give substantially equal absorption of photon radiation; and means for supporting said film and filters with the film adjacent the body.

2. A dosimeter as defined in claim 1 wherein the inner layer of each of Filters B and C is rhodium.

3. A dosimeter as defined in claim 2 wherein the outer layer of Filter B is cadmium and the outer layer of Filter C is tin.

4. A dosimeter as defined in claim 3 wherein Filter A consists of an outer layer of tin and an inner layer of a ferrous metal.

5. A dosimeter as defined in claim 4, wherein the thickness of the metals in the filters is as follows:

Filter A: Tin, 0.040 in. Stainless steel, 0.003 in.
   Filter B: Cadmium, 0.030 in. Rhodium, 0.010 in.
   Filter C: Tin, 0.030 in. Rhodium, 0.010 in.

6. A dosimeter as defined in claim 4 and further comprising, adjacent to the face of said film opposite to said filters, a layer of tin and a layer of a ferrous metal opposite Filter A, a sheet of rhodium opposite Filter B, a sheet of rhodium opposite Filter C, and a layer of lead opposite each of said filters.

7. A dosimeter as defined in claim 1 wherein said film comprises two sheets having emulsions of widely different sensitivity.

No references cited.

RALPH G. NILSON, *Primary Examiner.*

MORTON J. FROME, *Assistant Examiner.*